United States Patent
Yatabe (10) Patent No.: US 11,175,008 B2
(45) Date of Patent: Nov. 16, 2021

(54) VEHICLE LAMP HAVING A REFLECTOR WITH TWO PLURALITIES OF SURFACES SHARING A COMMON FOCAL POINT OF CORRESPONDING LIGHT SOURCE

(71) Applicant: Ichikoh Industries, Ltd., Isehara (JP)

(72) Inventor: Manabu Yatabe, Isehara (JP)

(73) Assignee: Ichikoh Industries, Ltd., Isehara (JP)

( * ) Notice: Subject to any disclaimer, the term of this patent is extended or adjusted under 35 U.S.C. 154(b) by 0 days.

(21) Appl. No.: 17/051,013

(22) PCT Filed: May 22, 2019

(86) PCT No.: PCT/JP2019/020260
§ 371 (c)(1),
(2) Date: Oct. 27, 2020

(87) PCT Pub. No.: WO2019/225645
PCT Pub. Date: Nov. 28, 2019

(65) Prior Publication Data
US 2021/0123580 A1    Apr. 29, 2021

(30) Foreign Application Priority Data

May 22, 2018    (JP) .............................. JP2018-097505

(51) Int. Cl.
*F21S 43/31*    (2018.01)
*F21S 43/20*    (2018.01)
(Continued)

(52) U.S. Cl.
CPC .............. *F21S 43/31* (2018.01); *F21S 43/20* (2018.01); *F21S 43/40* (2018.01); *F21V 7/09* (2013.01);
(Continued)

(58) Field of Classification Search
CPC .. F21S 41/36; F21S 41/32; F21S 41/33; F21S 43/31; F21S 43/40; F21V 7/09
See application file for complete search history.

(56) References Cited

U.S. PATENT DOCUMENTS 9,964,278 B2 *   5/2018   Matsumoto ............. F21S 43/19
10,704,757 B2 *  7/2020   Floc'h .................. B60Q 1/2607
(Continued)

FOREIGN PATENT DOCUMENTS

JP    59-173201 U     11/1984
JP    2013-149502 A   8/2013
(Continued)

OTHER PUBLICATIONS

International Search Report dated Aug. 6, 2019 in PCT/JP2019/020260 filed on May 22, 2019, 3 pages.

*Primary Examiner* — Robert J May
(74) *Attorney, Agent, or Firm* — Oblon, McClelland, Maier & Neustadt, L.L.P.

(57) ABSTRACT

A vehicle lamp includes a light source unit including a first light source and a second light source, a reflector which includes a plurality of first reflecting surfaces sharing a first focal point at a position corresponding to the first light source and a plurality of second reflecting surfaces sharing a second focal point at a position corresponding to the second light source, and which has a shape by which the first reflecting surfaces and the second reflecting surfaces diffuse a white light from the first light source and an orange light from the second light source in the right-left direction in an in-vehicle state, and an inner lens that emits the white light and the orange light reflected by the plurality of first reflecting surfaces and the plurality of second reflecting surfaces from a common emission surface to the front of a vehicle.

4 Claims, 8 Drawing Sheets (51) Int. Cl.
*F21S 43/40* (2018.01)
*F21V 7/09* (2006.01)
*F21W 103/20* (2018.01)
*F21W 103/55* (2018.01)

(52) U.S. Cl.
CPC ..... *F21W 2103/20* (2018.01); *F21W 2103/55* (2018.01)

(56) References Cited

U.S. PATENT DOCUMENTS

2016/0377253 A1   12/2016   Matsumoto et al.
2019/0162382 A1*   5/2019   Kang .................... F21S 43/14

FOREIGN PATENT DOCUMENTS

| JP | 2015-76184 A | 4/2015 |
| JP | 2017-10858 A | 1/2017 |

\* cited by examiner

VEHICLE LAMP HAVING A REFLECTOR WITH TWO PLURALITIES OF SURFACES SHARING A COMMON FOCAL POINT OF CORRESPONDING LIGHT SOURCE

TECHNICAL FIELD

The present invention relates to a vehicle lamp.

BACKGROUND ART

As one of the lighting equipment for vehicles, a front combination lamp that irradiates a pattern for a daytime running lamp and a pattern for a front turn lamp is known (see, for example, Patent Literature 1).

CITATION LIST

Patent Literature

PTL 1: Japanese Unexamined Patent Application Publication No. 2015-76184

SUMMARY OF THE INVENTION

Problems to be Solved by the Invention

In the vehicle lamp described in Patent Literature 1, in a lighting state, a stripe pattern is formed on a light emitting surface in the right-left direction in an in-vehicle state. On the other hand, in the front combination lamp as described above, it is required to make the luminance of the light emitting surface uniform in the right-left direction in the in-vehicle state.

Therefore, an object of the present disclosure is to provide a vehicle lamp capable of making the luminance of the light emitting surface uniform in the right-left direction in the in-vehicle state.

Means for Solving the Problem

According to one aspect of the present disclosure, provided is a vehicle lamp including a light source unit including a first light source and a second light source, a reflector which includes a plurality of first reflecting surfaces sharing a first focal point at a position corresponding to the first light source and a plurality of second reflecting surfaces sharing a second focal point at a position corresponding to the second light source, and which has a shape by which the first reflecting surfaces and the second reflecting surfaces diffuse a first light from the first light source and a second light from the second light source in the right-left direction in an in-vehicle state, and an inner lens that emits the first light and the second light reflected by the plurality of first reflecting surfaces and the plurality of second reflecting surfaces from a common emission surface to the front of a vehicle.

Effect of the Invention

According to the present disclosure, it is possible to provide a vehicle lamp capable of making the luminance of a light emitting surface uniform in the right-left direction in an in-vehicle state.

MODE FOR CARRYING OUT THE INVENTION

Hereinafter, an embodiment will be described in detail with reference to the accompanying drawings. The present invention is not limited by the embodiment. In addition, the components in the following embodiment include a component that can be easily replaced by those skilled in the art, or substantially the same component. In the following description, each of the front-rear, up-down, and right-left directions is a direction in an in-vehicle state where a vehicular headlight is mounted on a vehicle, and indicates a direction when the traveling direction of the vehicle is viewed from the driver's seat. In the present embodiment, it is assumed that the up-down direction is parallel to the vertical direction, and the right-left direction is the horizontal direction.

Figure 1:
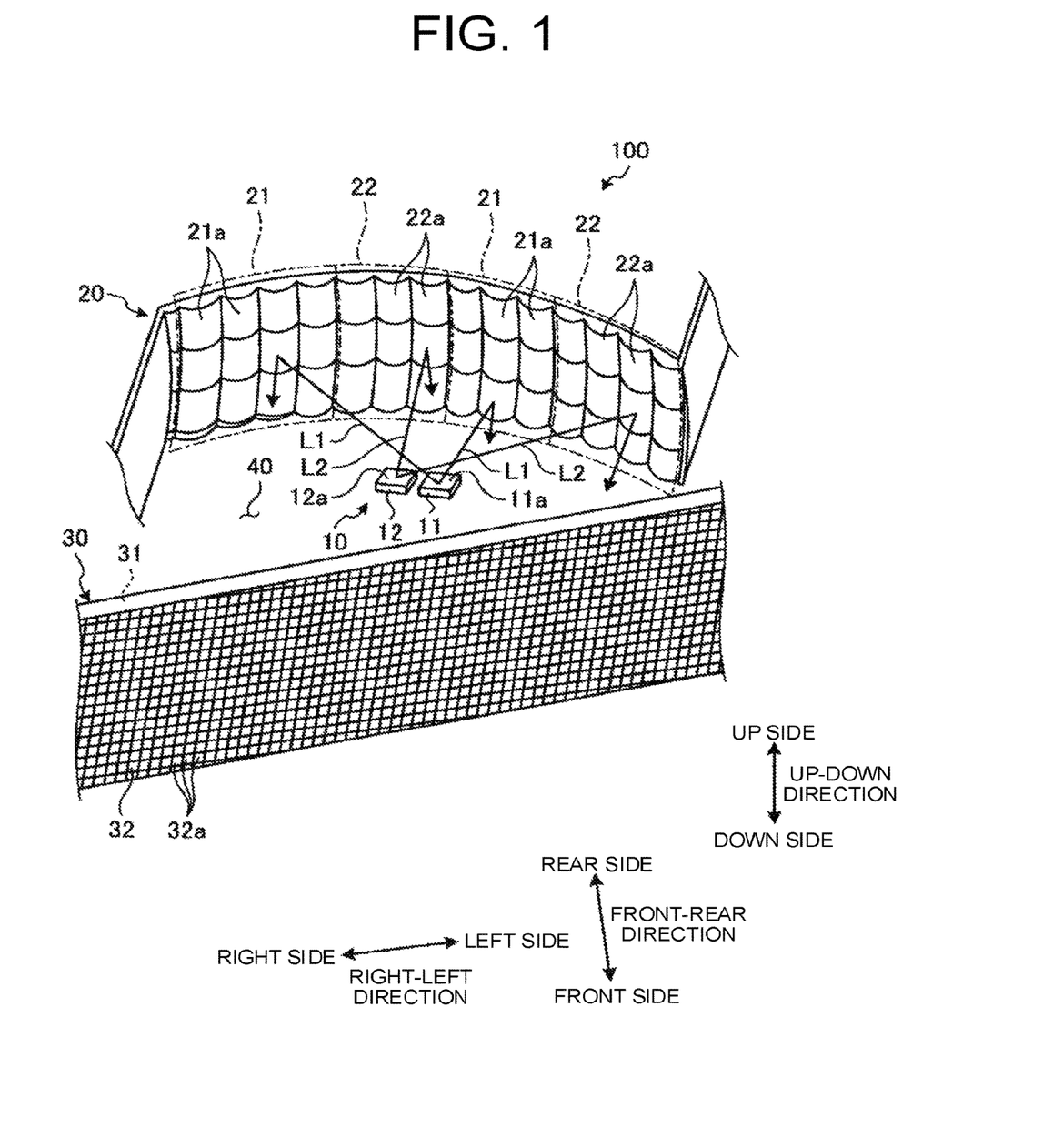
FIG. 1 is a perspective view illustrating an example of a vehicle lamp according to the present embodiment.
Figure 2:
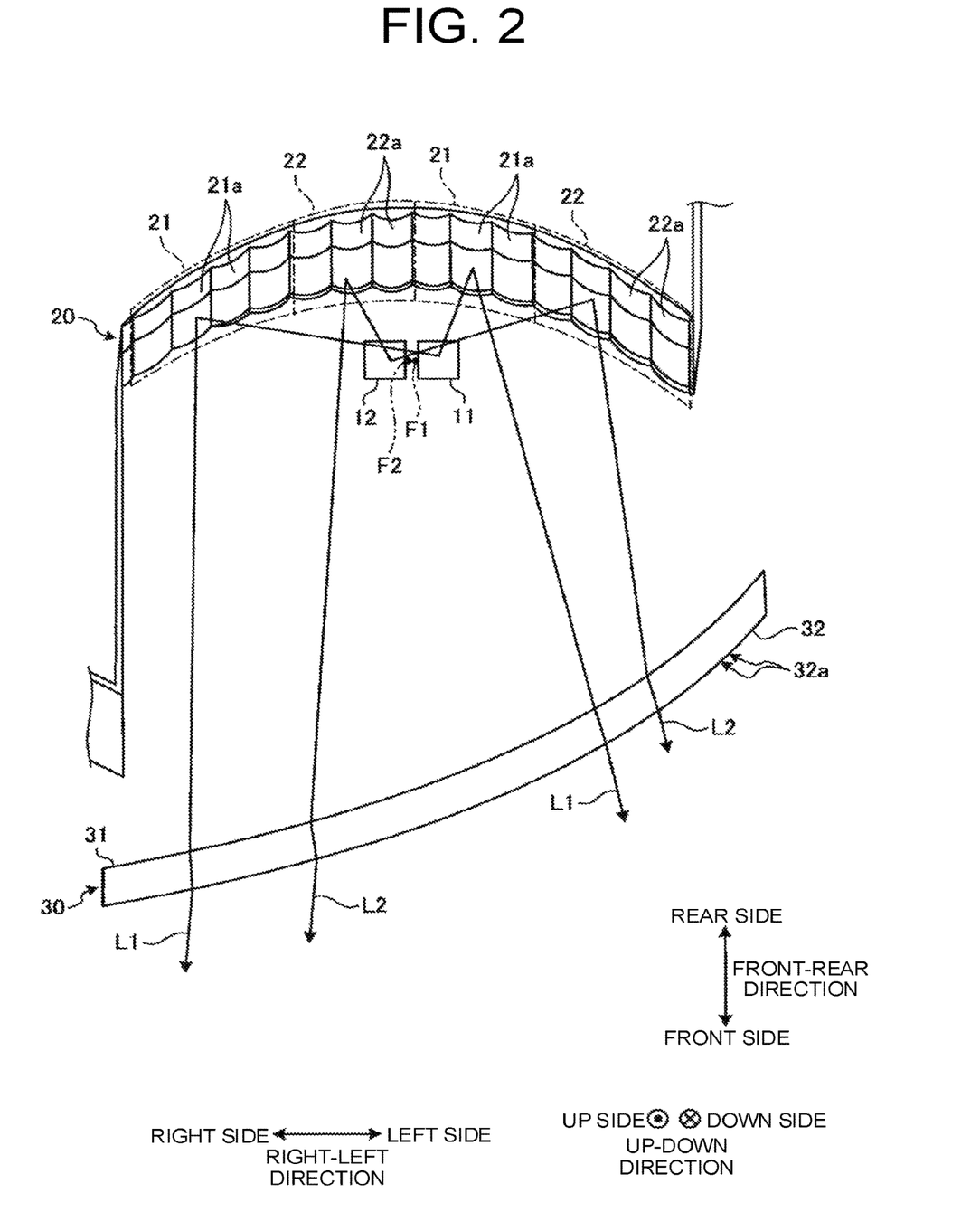
FIG. 2 is a plan view illustrating an example of the vehicle lamp.

FIG. 1 is a perspective view illustrating an example of a vehicle lamp 100 according to the present embodiment. FIG. 2 is a plan view illustrating an example of the vehicle lamp 100. The vehicle lamp 100 illustrated in FIGS. 1 and 2 is a front combination lamp that irradiates, for example, a pattern for a daytime running lamp and a pattern for a front turn lamp.

As illustrated in FIGS. 1 and 2, the vehicle lamp 100 includes a light source unit 10, a reflector 20, an inner lens 30, and a heat sink 40. In addition, the vehicle lamp 100 includes a lamp housing (not illustrated) that accommodates the light source unit 10, the reflector 20, the inner lens 30, and the heat sink 40, and a lamp lens. The vehicle lamp 100 may be provided with, for example, a plurality of sets of the light source unit 10 and the reflector 20 illustrated in FIGS. 1 and 2 in the right-left direction, and the inner lens 30 may be configured to extend in the right-left direction so as to correspond to the plurality of sets of the light source unit 10 and the reflector 20. Moreover, in a lamp chamber partitioned by the lamp housing and the lamp lens, for example, a low beam lamp, a high beam lamp, a fog lamp, a clearance lamp, a cornering lamp, and the like may be arranged in addition to the vehicle lamp 100.

The light source unit 10 includes a first light source 11 and a second light source 12. The first light source 11 and the second light source 12 are semiconductor light sources such as LEDs, OELs, and OLEDs (organic ELs). The first light source 11 and the second light source 12 each include light emitting surfaces 11a and 12a directed upward. The first light source 11 and the second light source 12 each emit light from the light emitting surfaces 11a and 12a so as to form a Lambertian distribution. The first light source 11 emits white light as, for example, a first light from the light emitting surface 11a. The second light source 12 emits white light as, for example, a second light from the light emitting surface 12a.

The reflector 20 reflects white light from the first light source 11 and orange light from the second light source 12. The reflector 20 has, for example, a shape extending in the right-left direction. The reflector 20 includes a plurality of first reflecting surfaces 21 and a plurality of second reflecting surfaces 22. The plurality of first reflecting surfaces 21 and the plurality of second reflecting surfaces 22 are each formed in a rotating paraboloid shape, and are disposed in a state of being alternately arranged in a row in the right-left direction in the reflector 20.

The plurality of first reflecting surfaces 21 reflect a white light L1 from the first light source 11 toward the front of a vehicle. The plurality of first reflecting surfaces 21 share a first focal point F1 at a position corresponding to the first light source 11. The first focal point F1 may be provided at the center of the light emitting surface 11a of the first light source 11, or may be provided at a position deviated from the center. The first focal point F1 may be provided at a position deviated to the inside of the vehicle (on the right side of the vehicle) with respect to the center of the light emitting surface 11a, such as a position between the first light source 11 and the second light source 12 (see FIG. 2).

The first reflecting surface 21 has a shape that diffuses the white light L1 from the first light source 11 in the right-left direction. Specifically, the first reflecting surface 21 includes a plurality of unit reflection areas 21a. The unit reflection areas 21a are arranged in a matrix in the right-left direction and the up-down direction in the first reflecting surface 21. Each unit reflection area 21a is curved in a convex shape toward the front of the vehicle, for example. That is, the plurality of unit reflection areas 21a have a configuration in which the convex curved surfaces are arranged in a matrix on the first reflecting surface 21 having a rotating paraboloid shape. Each unit reflection area 21a is formed to have a dimension in the right-left direction of, for example, about 10 mm, but is not limited to have this dimension. Each unit reflection area 21a is curved in a convex shape to thereby diffuse the white light L1 from the first light source 11 in the right-left direction and reflect same to the front of the vehicle. Therefore, as the first reflecting surface 21 as a whole, the inner lens 30 is irradiated with the white light L1 diffused and reflected in the right-left direction in each unit reflection area 21a.

Figure 3:
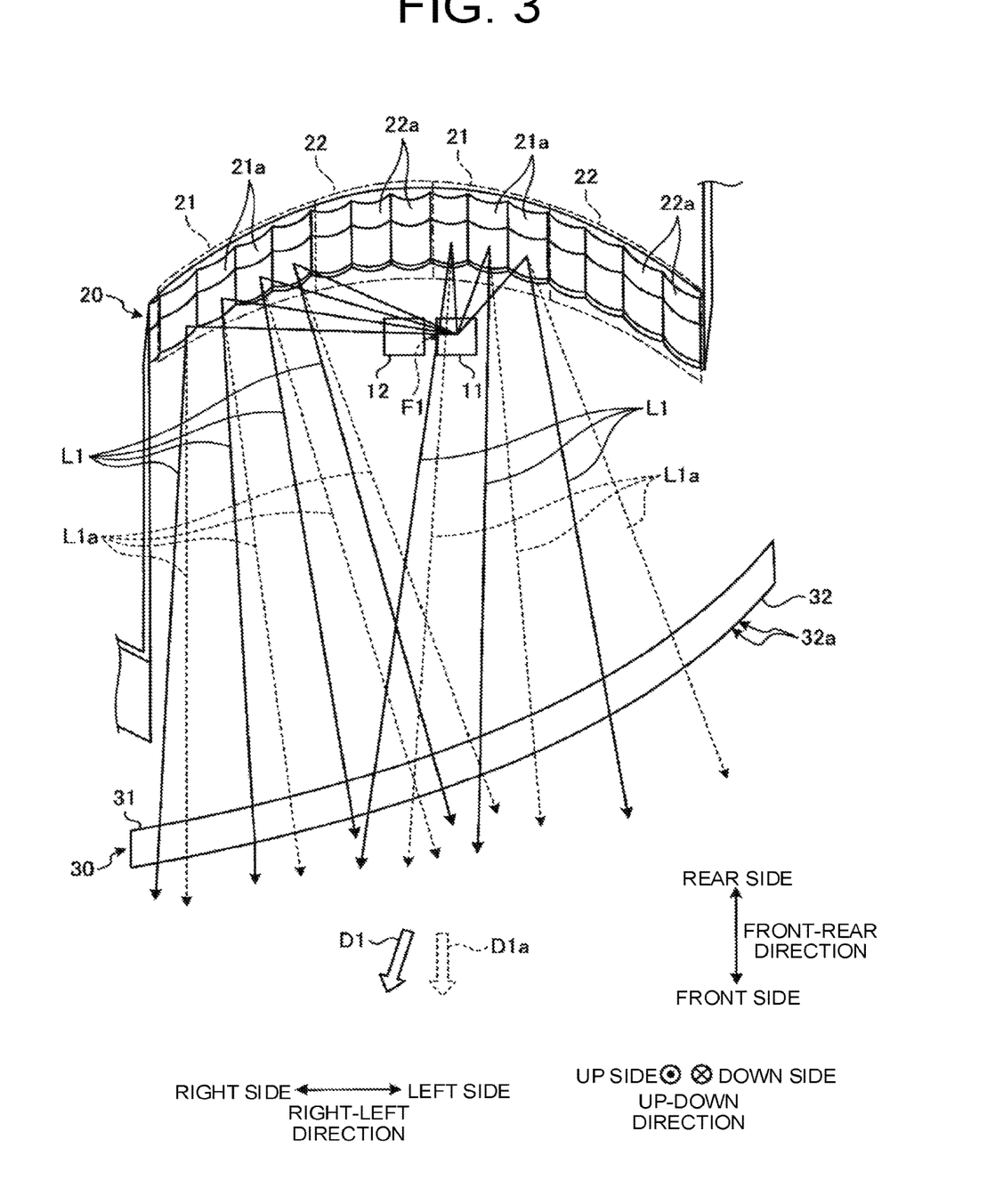
FIG. 3 is a diagram schematically illustrating an example of a case where white light is reflected by a first reflecting surface.

FIG. 3 is a diagram schematically illustrating an example of a case where white light is reflected by the first reflecting surface 21. FIG. 3 illustrates a comparison between a case where the first focal point F1 is provided at a position of the center of the light emitting surface 11a of the first light source 11 (hereinafter referred to as a first center position) and a case where the first focal point F1 is provided at a position where the first focal point F1 is shifted to the inside of the vehicle with respect to the first center position (hereinafter referred to as an inside position). As illustrated in FIG. 3, when the first focal point F1 is provided at the first center position, a white light L1a reflected by the reflector 20 is emitted in a direction D1a toward the front of the vehicle. On the other hand, when the first focal point F1 is provided at the inside position, the white light L1 reflected by the reflector 20 is emitted in the direction D1 slightly inward with respect to the front of the vehicle. Therefore, in the case where the first focal point F1 is provided at the inside position, the viewing angle of the white light L1 can be directed to the inside of the vehicle. In the case where the first focal point F1 is provided at the first center position, the luminance uniformity can be ensured by directing the viewing angle of the white light L1a toward the front of the vehicle.

The plurality of second reflecting surfaces 22 reflect an orange light L2 from the second light source 12 toward the front of a vehicle. The plurality of second reflecting surfaces 22 share a second focal point F2 at a position corresponding to the second light source 12. The second focal point F2 may be provided at the center of the light emitting surface 12a of the second light source 12, or may be provided at a position deviated from the center. The second focal point F2 may be provided at a position deviated to the outside of the vehicle (on the left side of the vehicle) with respect to the center of the light emitting surface 12a, such as a position between the first light source 11 and the second light source 12 (see FIG. 2).

The second reflecting surface 22 has a shape that diffuses the orange light L2 from the second light source 12 in the right-left direction. Specifically, the second reflecting surface 22 includes a plurality of unit reflection areas 22a. As is the case with the unit reflection areas 21a, the unit reflection areas 22a are arranged in a matrix in the right-left direction and the up-down direction in the second reflecting surface 22. Each unit reflection area 22a is curved in a convex shape toward the front of the vehicle, for example. That is, the plurality of unit reflection areas 22a have a configuration in which the convex curved surfaces are arranged in a matrix on the second reflecting surface 22 having a rotating paraboloid shape. Each unit reflection area 22a is formed to have a dimension in the right-left direction of, for example, about 10 mm, but is not limited to this dimension. Each unit reflection area 22a is curved in a convex shape to thereby diffuse the orange light L2 from the second light source 12 in the right-left direction and reflect same to the front of the vehicle. Therefore, as the second reflecting surface 22 as a whole, the inner lens 30 is irradiated with the orange light L2 diffused and reflected in the right-left direction in each unit reflection area 22a. The unit reflection areas 22a in the second reflecting surface 22 may be different in the size, shape, and arrangement from that of the unit reflection areas 21a in the first reflecting surface 21.

Figure 4:
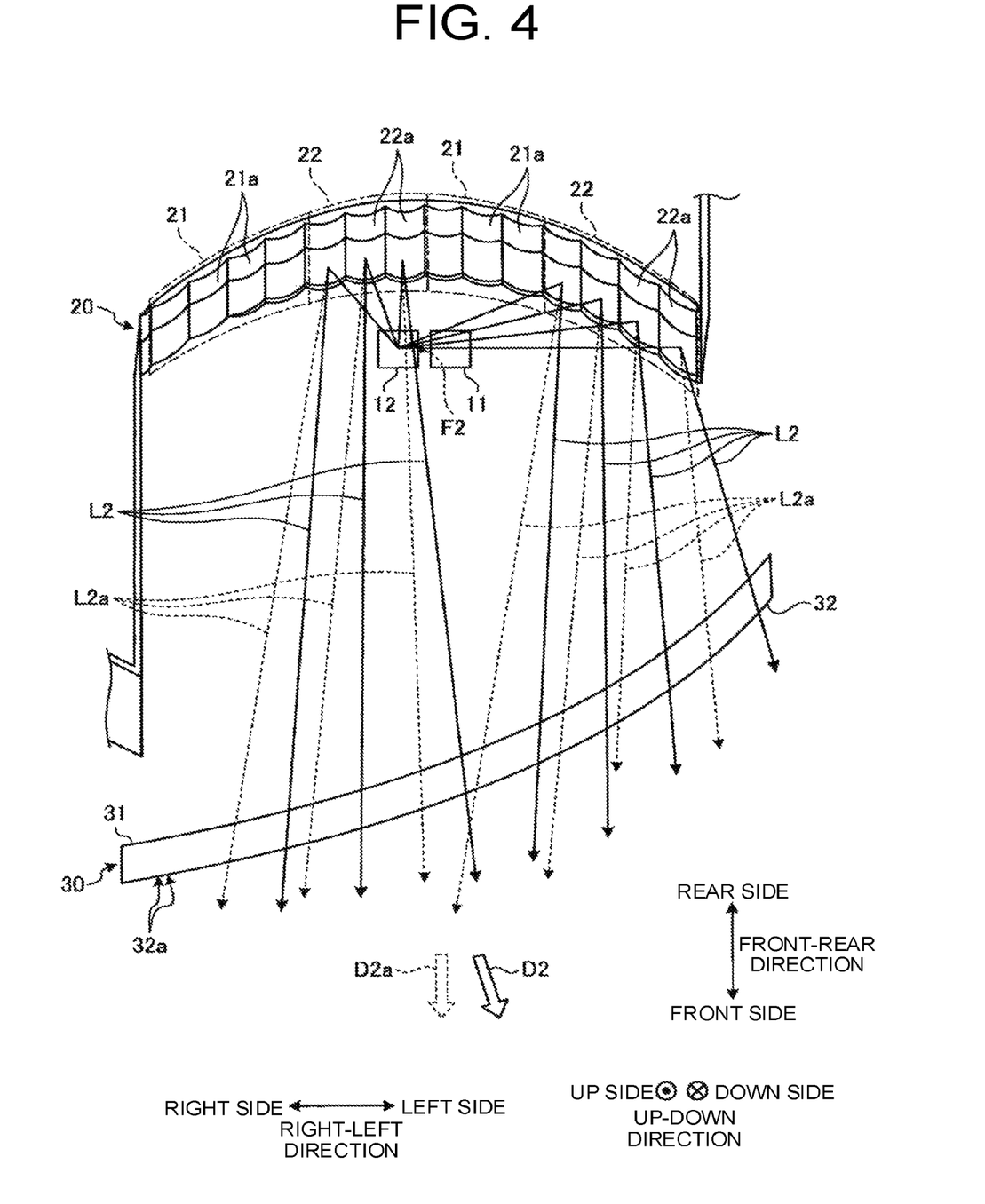
FIG. 4 is a diagram schematically illustrating an example of a case where orange light is reflected by a second reflecting surface.

FIG. 4 is a diagram schematically illustrating an example of a case where orange light is reflected by the second reflecting surface 22. FIG. 4 illustrates a comparison between a case where the second focal point F2 is provided at a position of the center of the light emitting surface 12a of the second light source 12 (hereinafter referred to as a second center position) and a case where the second focal point F2 is provided at a position where the second focal point F2 is shifted to the outside of the vehicle with respect to the second center position (hereinafter referred to as an outside position). As illustrated in FIG. 4, when the second focal point F2 is provided at the second center position, the orange light L2a reflected by the reflector 20 is emitted in a direction D2a toward the front of the vehicle. On the other hand, in the case where the second focal point F2 is provided at the outside position, the orange light L2 reflected by the reflector 20 is emitted in the direction D2 slightly outward with respect to the front of the vehicle. Therefore, in the case where the second focal point F2 is provided at the outside position, the orange light L2 can be reflected toward the outside of the vehicle, and thus the pattern for a front turn lamp can be effectively irradiated. In the case where the second focal point F2 is provided at the second center position, the luminance uniformity can be ensured by directing the viewing angle of the orange light L2a toward the front of the vehicle. In addition, the second focal point F2 may be provided, for example, at the center position of the light emitting surface 11a of the first light source 11 (the abovementioned first center position). In this case, the appearance of the white light L1 can be prioritized.

The first reflecting surface 21 and the second reflecting surface 22 are provided so as to diffuse light in a range of 40° or more and 60° or less in the right-left direction, for example. The diffusion range of light by a diffusing part 32a is not limited to this range. The white light L1 reflected by the plurality of first reflecting surfaces 21 is incident on an incident surface 31 of the inner lens 30 in an area overlapping in the right-left direction. Therefore, the white light L1 can be uniformly emitted from an emission surface 32 of the inner lens 30 in the right-left direction. Similarly, the orange light L2 reflected by the plurality of second reflecting surfaces 22 is incident on the incident surface 31 of the inner lens 30 in an area overlapping in the right-left direction. Therefore, the orange light L2 can be uniformly emitted from the emission surface 32 of the inner lens 30 in the right-left direction.

In addition, the first reflecting surface 21 and the second reflecting surface 22 are provided so as to diffuse light in a range of several degrees in the up-down direction, for example. With this, it is possible to prevent the white light L1 reflected by the first reflecting surface 21 and the orange light L2 reflected by the second reflecting surface 22 from protruding in the up-down direction of the incident surface 31 of the inner lens 30.

The inner lens 30 is disposed in front of the vehicle with respect to the reflector 20. The distance between the inner lens 30 and the reflector 20 is, for example, 10 mm or more at the closest portion, but is not limited to this distance. The inner lens 30 includes the incident surface 31 and the emission surface 32. The white light reflected by the first reflecting surface 21 of the reflector 20 and the orange light reflected by the second reflecting surface 22 are incident on the incident surface 31. The emission surface 32 emits the white light and orange light incident on the incident surface 31 to the front of the vehicle. The emission surface 32 is commonly provided for white light and orange light. That is, the inner lens 30 emits the white light and orange light from the common emission surface 32 to the front of the vehicle.

The emission surface 32 includes, for example, the diffusing part 32a that diffuses light in the right-left direction. The diffusing part 32a may be, for example, a fisheye lens pattern or a prism pattern of an other shape. The diffusing part 32a is provided so as to diffuse light in a range of 20° or more and 50° or less in the right-left direction, for example. The diffusion range of light by a diffusing part 32a is not limited to this range. By providing the diffusing part 32a, the inner lens 30 can uniformly emit the white light and orange light reflected by the reflector 20 in the right-left direction from the emission surface 32. Next, the operation of the vehicle lamp 100 will be described. When the first light source 11 is turned on, the white light L1 is emitted from the first light source 11. A part of this white light L1 is reflected in the unit reflection area 21a of the plurality of first reflecting surfaces 21 and diffuses in the right-left direction. The white light L1 reflected by the first reflecting surface 21 is incident on the incident surface 31 of the inner lens 30 and is emitted in a state of being diffused in the right-left direction by the diffusing part 32a of the emission surface 32.

In addition, the rest of the white light L1 emitted from the first light source 11 is reflected in the unit reflection area 22a of the plurality of second reflecting surfaces 22 and diffuses in the right-left direction. The white light L1 reflected by the second reflecting surface 22 is incident on the incident surface 31 of the inner lens 30 and is emitted in a state of being diffused in the right-left direction by the diffusing part 32a of the emission surface 32.

Figure 7:
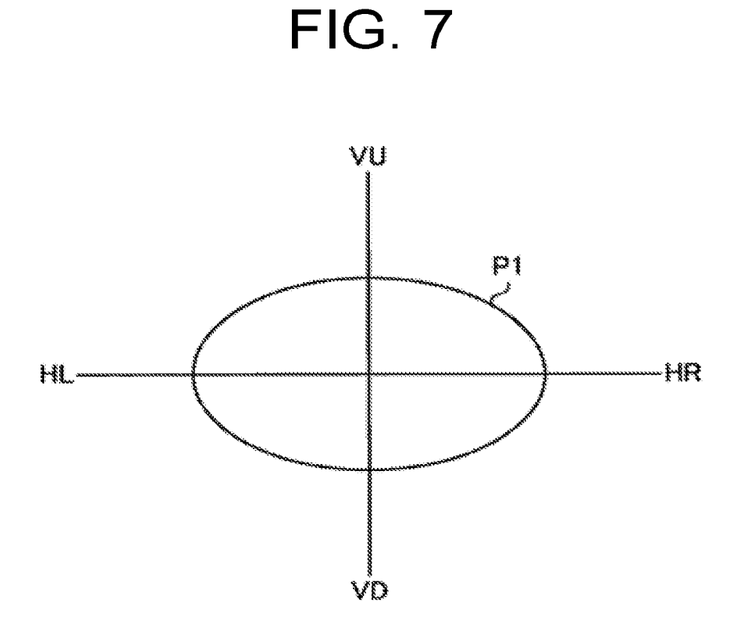
FIG. 7 is a diagram illustrating an example of a pattern for a daytime running lamp.

Therefore, the white light L1 reflected by the plurality of first reflecting surfaces 21 and the plurality of second reflecting surfaces 22 is evenly emitted from the emission surface 32 of the inner lens 30 in the right-left direction. As illustrated in FIG. 7, the white light L1 emitted from the inner lens 30 is irradiated in front of the vehicle as a pattern P1 for a daytime running lamp. FIG. 7 is a diagram illustrating an example of a pattern for a daytime running lamp irradiated on the screen in front of the vehicle, in which a reference sign "VU-VD" indicates the vertical line of the screen and a reference sign "HL-HR" indicates the horizontal line from the right to the left of the screen.

In addition, when the second light source 12 is turned on, the orange light L2 is emitted from the second light source 12. A part of this orange light L2 is reflected in the unit reflection area 22a of the plurality of second reflecting surfaces 22 and diffuses in the right-left direction. The orange light L2 reflected by the second reflecting surface 22 is incident on the incident surface 31 of the inner lens 30 and is emitted in a state of being diffused in the right-left direction by the diffusing part 32a of the emission surface 32.

In addition, the rest of the orange light L2 emitted from the second light source 12 is reflected in the unit reflection area 21a of the plurality of first reflecting surfaces 21 and diffuses in the right-left direction. The orange light L2 reflected by the first reflecting surface 21 is incident on the incident surface 31 of the inner lens 30 and is emitted in a state of being diffused in the right-left direction by the diffusing part 32a of the emission surface 32.

Figure 8:
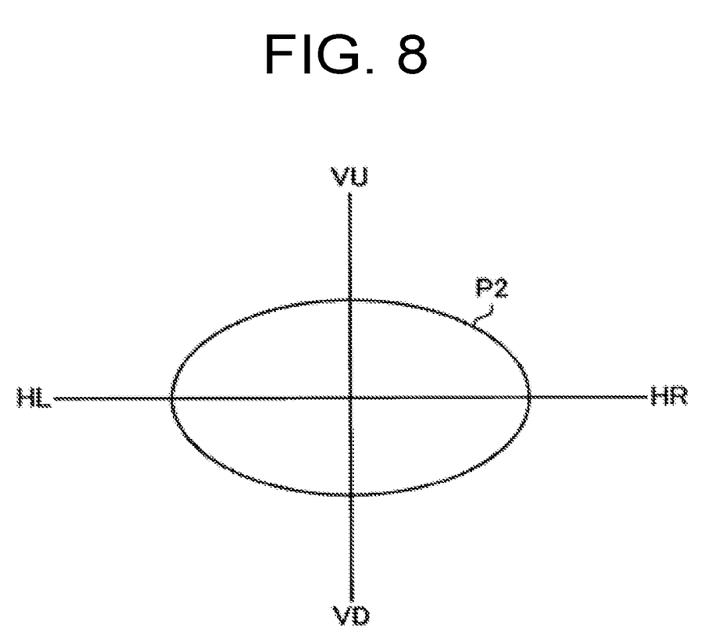
FIG. 8 is a diagram illustrating an example of a pattern for a front turn lamp.

Therefore, the orange light L2 reflected by the plurality of first reflecting surfaces 21 and the plurality of second reflecting surfaces 22 is evenly emitted from the emission surface 32 of the inner lens 30 in the right-left direction. As illustrated in FIG. 8, the orange light L2 emitted from the inner lens 30 is irradiated in front of the vehicle as a pattern P2 for a front turn lamp. FIG. 8 is a diagram illustrating an example of a pattern for a front turn lamp irradiated on the screen in front of the vehicle, in which, as is the case with FIG. 7, the reference sign "VU-VD" indicates the vertical line of the screen and the reference sign "HL-HR" indicates the horizontal line from the right to the left of the screen.

Figure 5:
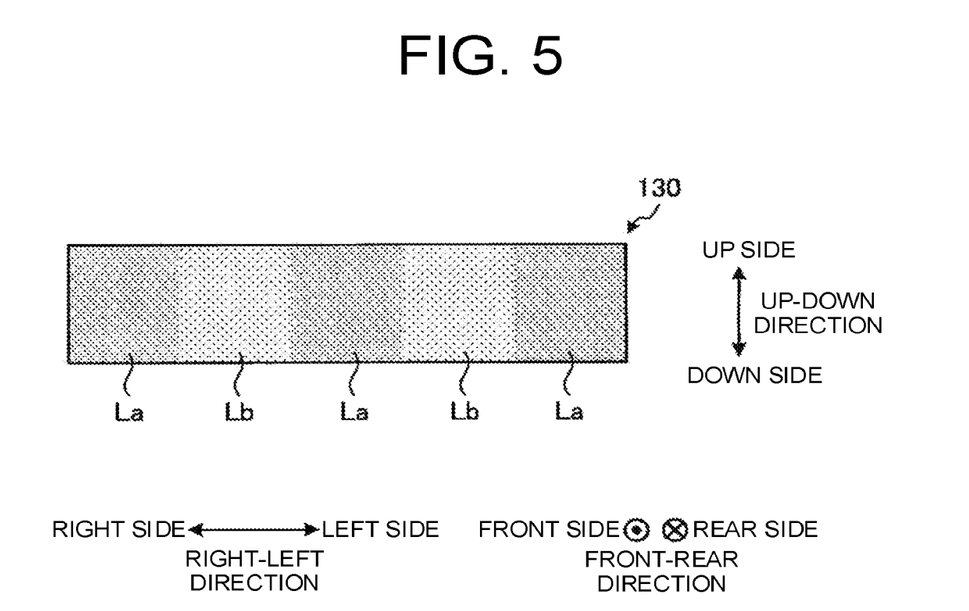
FIG. 5 is a diagram illustrating a case where the emission surface of the inner lens of a vehicle lamp according to a comparative example is viewed from the front.

FIG. 5 is a diagram illustrating a case where the emission surface of the inner lens of a vehicle lamp according to a comparative example is viewed from the front. In FIG. 5, as is the case with the vehicle lamp 100 of the present embodiment, the vehicle lamp according to the comparative example includes a light source unit including a first light source that emits white light and a second light source that emits orange light, a reflector in which a first reflecting surface that reflects white light and a second reflecting surface that reflects orange light are alternately arranged in the right-left direction, and an inner lens that emits the reflected light from the reflector to the front of the vehicle. The vehicle lamp according to this comparative example is different from the vehicle lamp 100 of the present embodiment in that a configuration is employed in which the first reflecting surface and the second reflecting surface of the reflector do not have a shape that diffuses the light from the first light source and the second light source in the right-left direction, and in that the diffusing part is not provided on the emission surface of the inner lens, and other configurations are the same as those of the vehicle lamp 100.

In the vehicle lamp according to such a comparative example, for example, when white light is emitted from the first light source, a part of the white light is reflected by the first reflecting surface and is incident on an inner lens 130 without being diffused. This white light is emitted from the emission surface of the inner lens 130 and is irradiated to the front of the vehicle as a concentrated pattern. In addition, the remaining portion of the white light is reflected by the second reflecting surface and is incident on the inner lens 130 in a diffused state. This white light is emitted from the emission surface of the inner lens 130 in a state where the luminance is lower than that of the abovementioned concentrated pattern, and is irradiated to the front of the vehicle as a diffused pattern. As a result, as illustrated in FIG. 5, when the emission surface of the inner lens 130 is viewed from the front, a stripe pattern is formed by a relatively strong white light La forming the concentrated pattern and a relatively weak white light Lb forming the diffused pattern. Similarly, when orange light is emitted from the second light source, a stripe pattern is formed on the emission surface of the inner lens 130.

Figure 6:
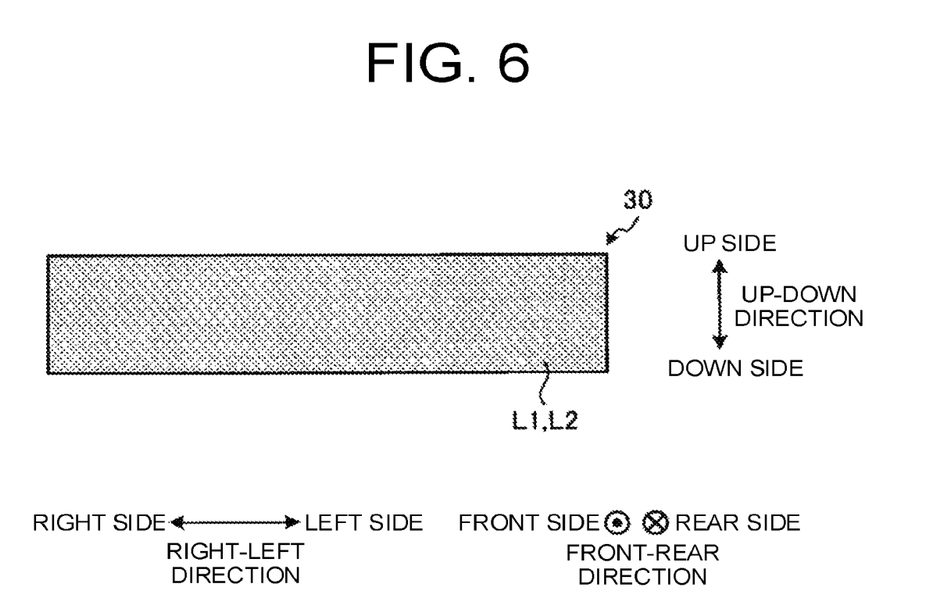
FIG. 6 is a diagram illustrating a case where the emission surface of the inner lens of the vehicle lamp according to the present embodiment is viewed from the front.

FIG. 6 is a diagram illustrating a case where the emission surface 32 of the inner lens 30 of the vehicle lamp 100 according to the present embodiment is viewed from the front. As illustrated in FIG. 6, in the vehicle lamp 100 according to the present embodiment, the first reflecting surface 21 and the second reflecting surface 22 of the reflector 20 have a shape that diffuses the white light L1 from the first light source 11 and the orange light L2 from the second light source 12 in the right-left direction. A diffusing part 32a is provided on the emission surface 32 of the inner lens 30. Therefore, in the first reflecting surface 21, the second reflecting surface 22, and the diffusing part 32a of the emission surface 32, the white light L1 from the first light source 11 and the orange light L2 from the second light source 12 diffuse in the right-left direction, respectively. As a result, as illustrated in FIG. 6, when the emission surface 32 of the inner lens 30 is viewed from the front, no stripe pattern is formed, and the entire emission surface 32 is in a state of uniformly emitting light.

As described above, the vehicle lamp 100 according to the present embodiment includes a light source unit 10 including a first light source 11 and a second light source 12, a reflector 20 which includes a plurality of first reflecting surfaces 21 sharing a first focal point F1 at a position corresponding to the first light source 11 and a plurality of second reflecting surfaces 22 sharing a second focal point F2 at a position corresponding to the second light source 12, and which has a shape by which the first reflecting surfaces 21 and the second reflecting surfaces 22 diffuse a white light L1 from the first light source 11 and an orange light L2 from the second light source 12 in the right-left direction in an in-vehicle state, and an inner lens 30 that emits the white light L1 and the orange light L2 reflected by the plurality of first reflecting surfaces 21 and the plurality of second reflecting surfaces 22 from a common emission surface 32 to the front of a vehicle.

With this configuration, the white light L1 from the first light source 11 and the orange light L2 from the second light source 12 are incident on an incident surface 31 of the inner lens 30 in a state where the white light L1 from the first light source 11 and the orange light L2 from the second light source 12 are diffused in the right-left direction by the first reflecting surface 21 and the second reflecting surface 22. In this case, the white light L1 and the orange light L2 are incident on the incident surface of the inner lens 30 with the luminance uniform in the right-left direction. As a result, the luminance can be made uniform in the right-left direction on the emission surface 32 of the inner lens 30 which is a light emitting surface.

In addition, in the vehicle lamp 100 according to the present embodiment, the inner lens 30 includes, on the emission surface 32, a diffusing part 32a that diffuses the white light L1 and the orange light L2 reflected by the first reflecting surface 21 and the second reflecting surface 22 in the right-left direction in the in-vehicle state. With this, the white light L1 and the orange light L2 incident on the inner lens 30 can be further diffused in the right-left direction. Therefore, the luminance can be made more uniform in the right-left direction on the emission surface 32 of the inner lens 30.

In addition, in the vehicle lamp 100 according to the present embodiment, the first reflecting surfaces 21 and the second reflecting surfaces 22 are disposed in a state of being alternately arranged in the right-left direction in the in-vehicle state. With this, it is possible to suppress the formation of a stripe pattern of the white light L1 and the orange light L2 on the emission surface 32 of the inner lens 30.

In addition, in the vehicle lamp 100 according to the present embodiment, the plurality of first reflecting surfaces 21 and the plurality of second reflecting surfaces 22 each include a plurality of unit reflection areas 21a and 22a curved in a concave or convex shape. With this, the white light L1 and the orange light L2 can be easily diffused in the right-left direction on the plurality of first reflecting surfaces 21 and the plurality of second reflecting surfaces 22.

In addition, in the vehicle lamp 100 according to the present embodiment, the plurality of unit reflection areas 21a and 22a are arranged in a matrix in the right-left direction and an up-down direction in the in-vehicle state in each of the first reflecting surfaces 21 and each of the second reflecting surfaces 22. With this, the unit reflection areas 21a and 22a can be efficiently arranged on the first reflecting surface 21 and the second reflecting surface 22.

The technical scope of the present invention is not limited to the above embodiment, and can be modified as appropriate without departing from the spirit and scope of the present invention. For example, in the above embodiment, the configuration has been described as an example, in which the first light source 11 that emits the white light L1 is disposed outside the vehicle and the second light source 12 that emits the orange light L2 is disposed inside the vehicle. However, the configuration is not limited to this, and for example, the first light source 11 may be disposed inside the vehicle and the second light source 12 may be disposed outside the vehicle. In this case, in the reflector 20, the first focal point F1 of the plurality of first reflecting surfaces 21 may be provided at the center of the light emitting surface 11a of the first light source 11, or for example, may be provided at a position shifted to the outside of the vehicle (left side of the vehicle) with respect to the center of the light emitting surface 11a, such as a position between the first light source 11 and the second light source 12. Similarly, in the reflector 20, the second focal point F2 of the plurality of second reflecting surfaces 22 may be provided at the center of the light emitting surface 12a of the second light source 12, or for example, may be provided at a position shifted to the inside of the vehicle (right side of the vehicle) with respect to the center of the light emitting surface 12a, such as a position between the first light source 11 and the second light source 12.

In addition, in the above embodiment, the case has been described as an example, in which the first reflecting surface 21 and the second reflecting surface 22 are disposed in a state of being alternately arranged in the right-left direction in the in-vehicle state, but the arrangement is not limited to this. For example, the first reflecting surface 21 and the second reflecting surface 22 may be disposed in a state where at least one of the first reflecting surface 21 and the second reflecting surface 22 is continuously arranged in the right-left direction.

In addition, in the above embodiment, the case has been described as an example, in which the plurality of unit reflection areas 21a and 22a are arranged in a matrix in the right-left direction and an up-down direction in the in-vehicle state in each of the first reflecting surfaces 21 and each of the second reflecting surfaces 22, but the arrangement is not limited to this, and an other arrangement may be used.

Moreover, in the above embodiment, the case has been described as an example, in which the plurality of first reflecting surfaces 21 and the plurality of second reflecting surfaces 22 each include a plurality of unit reflection areas 21a and 22a curved in a concave or convex shape as a configuration that diffuses the white light L1 and the orange light L2 in the right-left direction, but the configuration is not limited to this. For example, the plurality of first reflecting surfaces 21 and the plurality of second reflecting surfaces 22 may be configured so as not to include the unit reflection areas 21a and 22a, such as to curve over the entire right-left direction.

Moreover, in the above embodiment, the case has been described as an example, in which the plurality of first reflecting surfaces 21 and the plurality of second reflecting surfaces 22 each include a plurality of unit reflection areas 21a and 22a curved in a concave or convex shape as a configuration that diffuses the white light L1 and the orange light L2 in the right-left direction, but the configuration is not limited to this. For example, the plurality of first reflecting surfaces 21 and the plurality of second reflecting surfaces 22 may be configured so as not to include the unit reflection areas 21a and 22a, such as to curve over the entire right-left direction.

In addition, in the above embodiment, the configuration has been described as an example, in which the vehicle lamp 100 diffuses the white light L1 and the orange light L2 in the right-left direction by the first reflecting surface 21 and the second reflecting surface 22 and the emission surface 32 of the inner lens 30, but the configuration is not limited to this. For example, in the inner lens 30, the diffusing part 32a may not be provided on the emission surface 32. Moreover, in the above embodiment, as the vehicle lamp 100, the vehicle lamp having a configuration for irradiating the pattern P1 for a daytime running lamp and the pattern P2 for a front turn lamp has been described as an example, but a vehicle lamp having a configuration for irradiating a pattern other than these may be used. For example, the vehicle lamp 100 may be configured to irradiate a pattern for a clearance lamp and a pattern for a front turn lamp, or may be configured to irradiate a pattern for a daytime running lamp and a pattern for a clearance lamp. Furthermore, the vehicle lamp 100 may be configured to irradiate a pattern for a tail lamp and a pattern for a stop lamp. In this case, it is possible to apply the description in which the front and the rear in the front-rear direction in the above description are replaced with each other.

In addition, in the above embodiment, the configuration has been described as an example, in which in the light source unit 10, the first light source 11 emits the white light L1 and the second light source 12 emits the orange light L2, but the configuration is not limited to this. For example, both the first light source 11 and the second light source 12 may be configured to emit white light. Moreover, one of the first light source 11 and the second light source 12 may emit white light, and the other may emit light having a color different from that of orange light, such as red light.

Furthermore, in the above embodiment, the configuration has been described as an example, in which the semiconductor type light source is used as the first light source 11 and the second light source 12, but the configuration is not limited to this. For example, at least one of the first light source 11 and the second light source 12 may be a light source other than the semiconductor type light source, for example, a light source such as a discharge lamp or an incandescent lamp.

REFERENCE SIGNS LIST

F1 . . . first focal point, F2 . . . second focal point, L1, La, Lb . . . white light, L2 . . . orange light, P1, P2 . . . pattern, 10 light source unit, 11 first light source, 11a, 12a . . . light emitting surface, 12 . . . second light source, 20 . . . reflector, 21 first reflecting surface, 21a, 22a unit reflection area, 22 second reflecting surface, 30, 130 . . . inner lens, 31 . . . incident surface, 32 . . . emission surface, 32a . . . diffusing part, 40 . . . heat sink, 100 . . . vehicle lamp

The invention claimed is:

1. A vehicle lamp comprising:
a light source unit including a first light source and a second light source;
a reflector including a plurality of first reflecting surfaces sharing a first focal point at a position corresponding to the first light source and a plurality of second reflecting surfaces sharing a second focal point at a position corresponding to the second light source, the reflector having a shape by which the first reflecting surfaces and the second reflecting surfaces diffuse a first light from the first light source and a second light from the second light source in the right-left direction in an in-vehicle state; and
an inner lens configured to emit the first light and the second light reflected by the plurality of first reflecting surfaces and the plurality of second reflecting surfaces from a common emission surface to a front of a vehicle,
wherein the first reflecting surfaces and the second reflecting surfaces are disposed in a state of being alternately arranged in the right-left direction in the in-vehicle state.

2. The vehicle lamp according to claim 1, wherein the inner lens includes, on the emission surface, a diffusing part diffusing the first light and the second light reflected by the first reflecting surfaces and the second reflecting surfaces in the right-left direction in the in-vehicle state.

3. The vehicle lamp according to claim 1, wherein the plurality of first reflecting surfaces and the plurality of second reflecting surfaces each include a plurality of unit reflection areas curved in a concave or convex shape.

4. The vehicle lamp according to claim 3, wherein the plurality of unit reflection areas are arranged in a matrix in the right-left direction and an up-down direction in the in-vehicle state in each of the first reflecting surfaces and each of the second reflecting surfaces.

* * * * *